Jan. 10, 1928.　　　　　　　　　　　　　　　　　1,655,538
L. G. FORD ET AL
APPARATUS FOR STERILIZING AND DRYING MILK CANS AND COVERS
Filed Jan. 22, 1924　　　　3 Sheets-Sheet 1
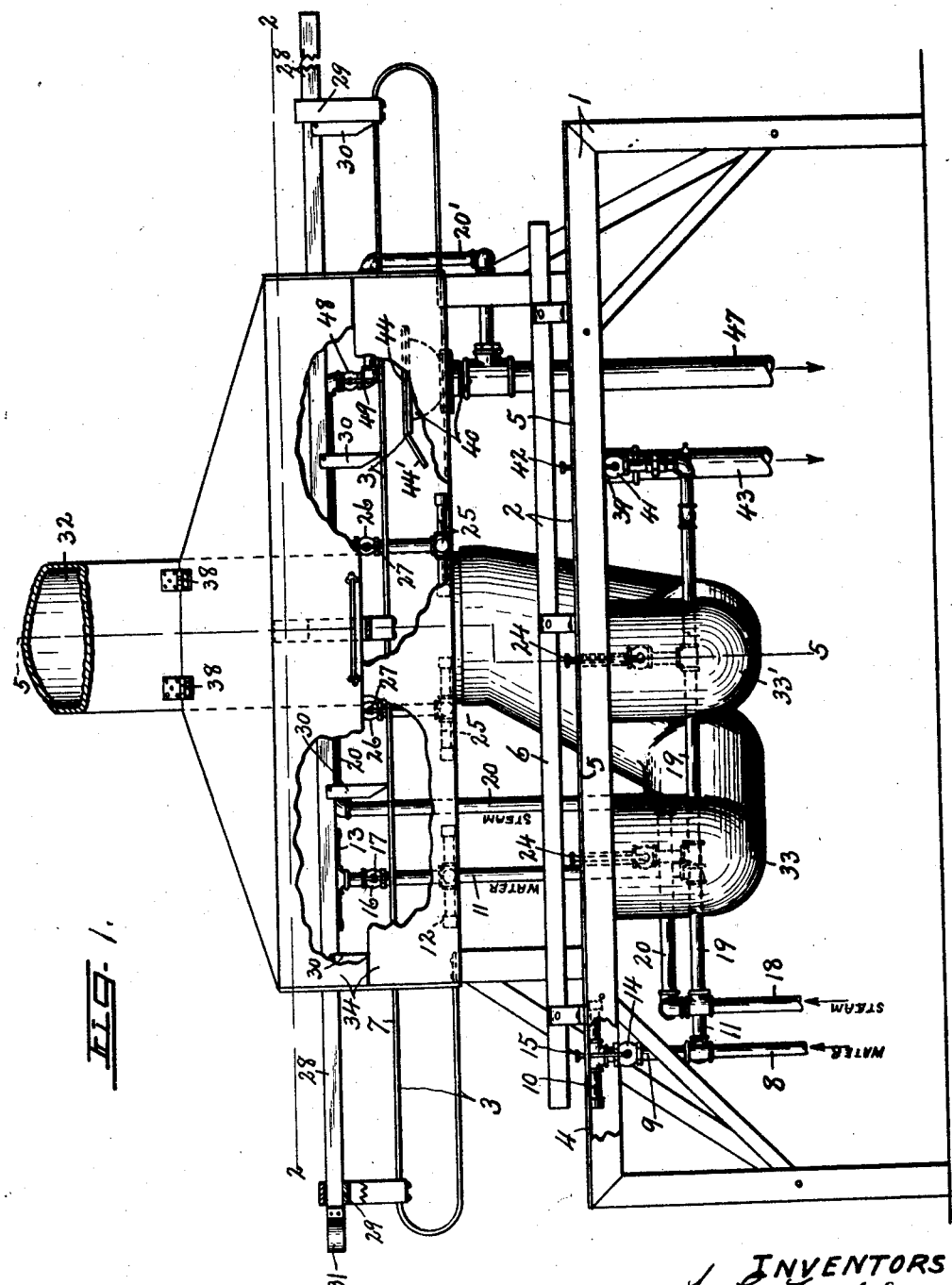
WITNESS
INVENTORS
L. G. Ford and
F. H. Van Dyne
BY Denison & Thompson
ATTORNEYS

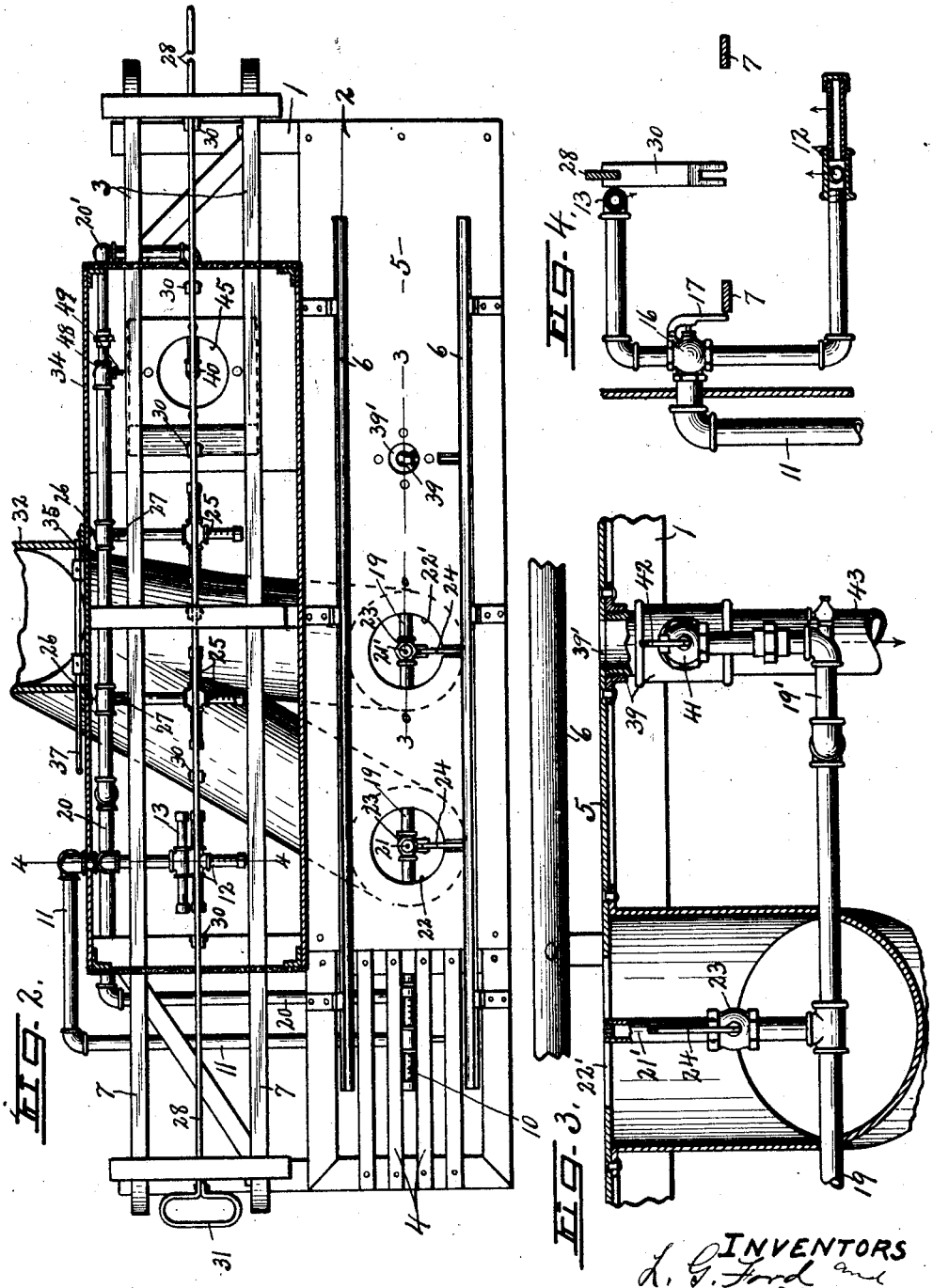

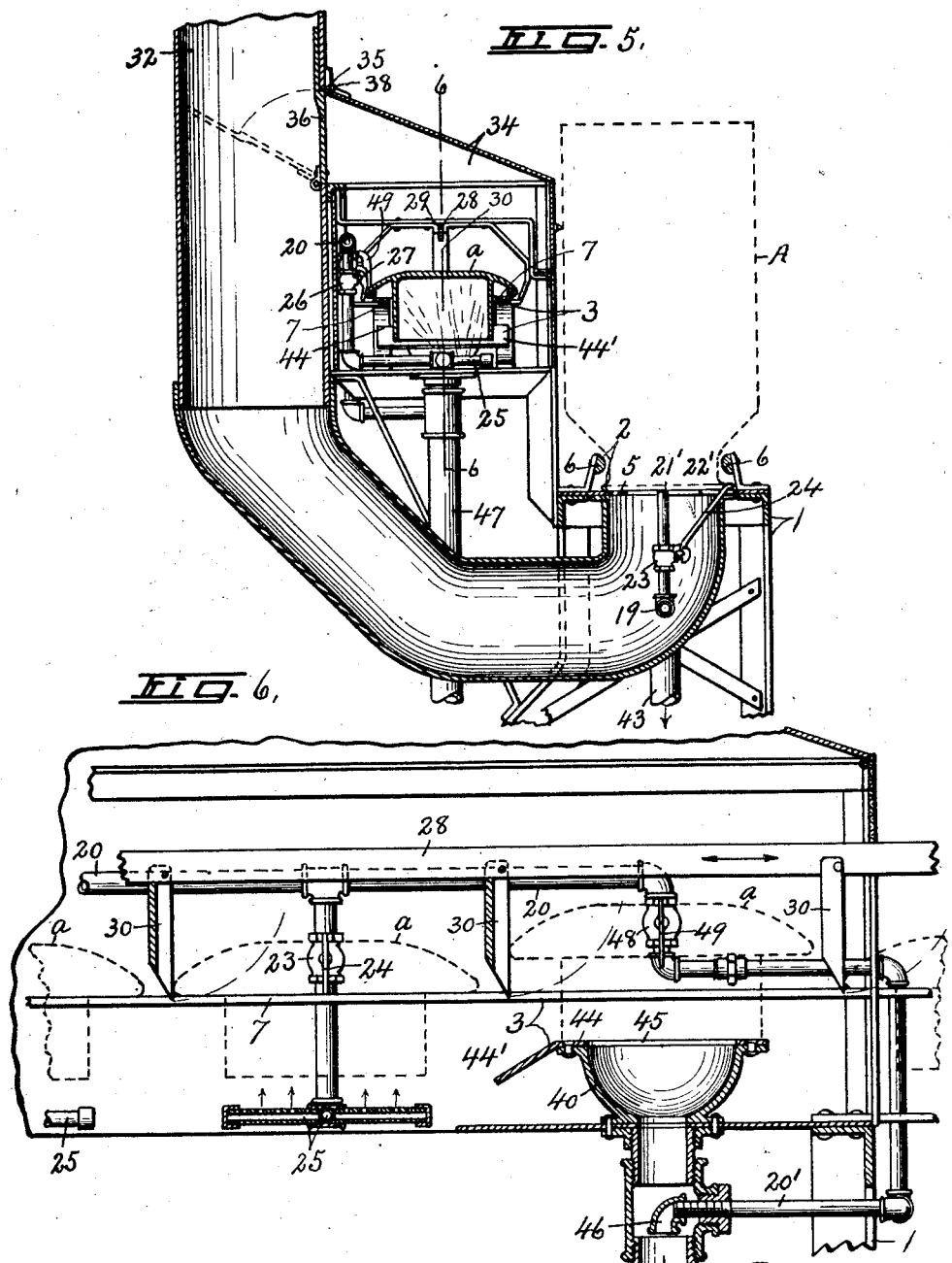

Patented Jan. 10, 1928.

1,655,538

UNITED STATES PATENT OFFICE.

LOUIS G. FORD, OF AUBURN, AND WILLIAM H. VAN DINE, OF TULLY, NEW YORK.

APPARATUS FOR STERILIZING AND DRYING MILK CANS AND COVERS.

Application filed January 22, 1924. Serial No. 687,759.

This invention relates to apparatus for sterilizing and drying milk cans including the covers thereof which have been previously cleansed by any suitable washing process.

It is well known however, that even the most thorough methods of washing commonly employed is insufficient to remove injurious bacteria, dust and other foreign matter from the corners and crevices, particularly on the interior of the cans which should be thoroughly hygienized by sterilization to prevent contamination of the fresh milk which may be placed therein, and while we are aware that steam is a highly efficient sterilizing agent for removing or destroying dangerous bacteria, dust and other foreign matter which may have lodged within the cans or covers, it must be regulated and applied in such manner as to prevent the recollection or reformation of detrimental deposits within the cans or covers after sterilization.

The main object therefore, of our present invention is to provide simple and efficient apparatus for thoroughly cleansing and sterilizing milk cans, and particularly the inner sides thereof by means of hot water or steam or both hot water and steam without exposing such interiors to recollection of dust or other foreign matter therein after the sterilizing operation.

Another object is to apply the sterilizing steam to the interiors of the cans and covers in such manner as to prevent its escape into the room in which the sterilizing process is carried on.

A further object is to provide the apparatus with means for withdrawing the moisture from the interior of the sterilized cans and covers immediately following the sterilizing operation.

A still further object is to provide means whereby the application of the hot water and steam to the interior of the cans may be rendered substantially automatic as those parts are fed along suitable guideways and at the same time to arrange the several applicators for the hot water, steam and driers in sequential relation so that the cans and covers will be successively washed with the hot water, sterilized by the steam and the moisture of condensation of the steam removed for drying the cans as the cans or covers are successively moved along the guides by any suitable motive power.

Other objects and uses relating to specific parts of the apparatus will be brought out in the following description.

In the drawings:

Figure 1 is a front elevation, partly broken away, of an apparatus embodying various features of our invention.

Figure 2 is a horizontal sectional view of the same apparatus taken in the plane of line 2—2, Figure 1.

Figure 3 is an enlarged detail vertical sectional view taken in the plane of line 3—3, Figure 2.

Figure 4 is an enlarged detail vertical sectional view taken in the plane of line 4—4, Figure 2.

Figure 5 is a transverse vertical sectional view taken in the plane of line 5—5, Figure 1, and Figure 6 is a longitudinal vertical sectional view taken in the plane of line 6—6, Figure 5.

As illustrated, this apparatus comprises a main supporting frame —1— having a horizontal can guide —2— and a horizontal cover guide —3— parallel with but in planes above and at the rear of the can guide —2—, each of said guides being of sufficient length to receive and support respectively, a plurality of cans and a plurality of covers thereon, the term "cans" being used to indicate the open milk receptacles, while the term "cover" indicates the closures for the open ends of the cans.

The receiving end of the can guide —2— is provided with a grid or open work bottom —4— of sufficient length to receive and support a can as —A—, Figure 5, thereon, while the bottom of the remaining portion of the guide consists of a substantially flat plate —5— which forms a continuation of the grid —4— and is of sufficient length to receive a plurality of cans in sequence lengthwise thereof.

The grid —4— preferably consists of a plurality of flat bars arranged in transversely spaced relation as shown in Figure 2. to permit the passage of a washing fluid from the under side between them and into the open ends of the cans which are preferably supported in an inverted position upon the bottom of the guide —2— and are successively fed by hand along said guide between opposite lengthwise side rails —6— forming a part of said guide.

The cover guide —3— extends from end to end of the can guide —2— and comprises a pair of parallel bars —7— in transversely spaced relation to support the rim of the cover and also to allow the flange of the cover to pass downwardly between them, the ends of the bars —7— being returned toward each other and secured to portions of the main frame —1—, as shown more clearly in Figure 1, the can covers being successively fed along the guide bars —7— with their open sides at the bottom.

Washing means.

The cans and covers are usually cleansed by washing before they are brought to the sterilizing and drying machine, but as a matter of precaution for hygienic purposes, they are subjected to a further washing process by hot water immediately upon their entrance into the sterilizing apparatus and for this purpose, is provided a feed pipe —8— adapted to be connected to any available source of hot water supply and is provided with a branch —9— leading to a distributing head —10— on the under side of the grid —4—, and with another branch —11— leading to a pair of distributing heads —12— and —13— which are located respectively below and above the horizontal plane of the guide bars —7— at the infeed end thereof.

The distributing head —10— is provided with perforations in its upper side registering with one of the spaces between the bars of the grid —4— along the longitudinal center of the bottom of the guide —2— for discharging hot water into the open ends of the cans as they are successively registered with said distributing head.

The discharge of the hot water into the cans is automatically controlled by the movement of the cans along the grid —4— and for this purpose, the branch pipe —9— is provided with a normally closed valve —14— having an operating member —15— projecting into the path of movement of a portion of each can as it is moved along the grid —4— of the guide —2— for opening said valve simultaneously with the registration of the open end of the can with the perforations in the distributing head, whereby the hot water which is introduced into the can effects a partial sterilization and also a loosening or removal of any solid matter which may have collected in the corners or crevices on the interior of the can.

This hot water cleansing and partial sterilizing of the interior of the cans may be continued as long as the cans are held in registration with the distributing head but immediately upon the movement of the can from the distributing head, toward the sterilizing means presently described, the valve operating member —15— is released to allow the valve to automatically close.

The distributing heads —12— and —13— on the branch pipe —11— are located respectively below and above the path of movement of the covers along and between the guide bars —7— and are provided with perforated sides facing each other for directing hot water into the interior of the cover and also against the exterior thereof for cleansing and partially sterilizing purposes.

The branch pipe —11— is provided with a normally closed self-closing valve —16— having an operating member —17— projecting into the path of movement of a portion of each cover as the latter is moved along the guide bars —7— into registration with the distributing heads —12— and —13— whereupon the engagement of the cover with the operating member —17— will automatically open the valve —16— and allow the hot water to pass through the heads —12— and —13— into the interior and against the exterior of the registering cover.

Sterilizing means.

The interiors of the cans and covers are preferably sterilized by steam and for this purpose, is provided a feed pipe —18— adapted to be connected to any available source of steam supply and is provided with branch pipes —19— and —20— leading respectively to the can guide —2— and to the cover guide —3—.

The branch pipe —19— extends lengthwise of and below the can guide —2— and is provided with a plurality of, in this instance, two steam discharge nozzles —21— and —21'— in longitudinally spaced relation to each other and to the hot water distributing head —10— and having their discharge ends registered with suitable openings —22— and —22'— in the bottom plate —5— of the guide —2— and preferably along the longitudinal center of said guide a distance apart somewhat greater than the diameter of the open ends of the cans which rest upon the plate —5—.

Each of the nozzles —21— and —21'— is provided with a normally closed self-closing valve —23— having an operating member —24— projecting into the path of movement of a portion of the can as the open end thereof is registered with the corresponding opening —22— or —22'— whereupon the valve will be automatically opened to admit steam to the interior of the registering can for sterilizing and cleansing purposes, it being understood that as soon as the can has been moved beyond its steam-receiving position, the operating member —24— will be released to allow the valve to close.

The branch steam supply pipe —20— is also provided with a plurality of, in this instance two, steam distributing heads or nozzles —25— in longitudinally spaced relation to each other and to the hot water distributing head —12—, a distance somewhat greater than the diameters of the covers and in substantially the same plane as the head —12— below the path of movement of the open end of said cover.

These distributing heads or nozzles are provided with perforations in their upper sides for discharging steam directly into the open ends of the covers as the latter are fed along the guide —3— into registration therewith.

The pipes leading to the distributing head or nozzles —25— are provided with normally closed self-closing valves —26— having operating members —27— normally projecting into the path of movement of the covers as the latter are moved along the guide —3— to be automatically opened by said covers when registering with their respective distributing heads or nozzles —25— and thereby to cause the discharge of steam directly into the open ends of the covers.

These covers may be successively fed along the guide —3— by any suitable means operable at will such for example, as a longitudinally reciprocating bar —28— guided in suitable ways —29— and provided with a series of one-way feed pawls —30— in longitudinally spaced relation thereon, said bar being provided at one end with an operating handle —31— for reciprocating the same.

Suitable means is provided for removing surplus steam which may be discharged into the interiors of the cans and covers and thereby to prevent escape of such steam into the room in which the apparatus is located, said means consisting in this instance of an upright draft flue —32— having its upper end leading to the atmosphere or to a suitable condensing chamber not shown and its lower end provided with pipes —33— and —33'— which are connected respectively to the under sides of the openings —22— and —22'— and are secured to the guide plate —5— as shown in Figure 3 for confining and removing excess steam from the interiors of the cans during the steaming and sterilizing operations thereon.

The hot water nozzles —12— and —13— and also the steam distributing nozzles —25—, together with the adjacent portions of the cover guide —3— are inclosed in a hood or housing —34— extending some distance above the guide —3— and having its upper portion connected by a passage —35— to the draft flue —32—.

The passage —35— and also the passage through the flue —32— is controlled by a single valve or damper —36—, Figure 5, said valve being provided with an operating member —37— extending to the exterior of the flue —32— to permit it to be shifted from the position shown by full lines to the position shown by dotted lines in Figure 5 or vice versa, for closing communication between the hood and flue and opening communication from the openings —22— and —22'— through the flue or for closing communication between the upper portion of the flue and openings —22— and —22'— and opening communication between the hood and upper portion of the flue.

That is, when the cans are being sterilized, the valve —36— is adjusted to close the passage —35— and to open the communication between the branches —33— and —33'— and upper portion of the flue while on the other hand, when the covers are being sterilized, the valve —36— is adjusted to the position shown by dotted lines for opening communication between the hood and upper portion of the flue and cutting off communication with the branch pipes —33— and —33'— whereby the full force of the draft may be directed to the removal of extra steam or vapor delivered either to the cans or covers.

The top and upper front portion of the hood is movable and is preferably hinged at —38— to the front portion of the flue —32— above the passage —35— to permit it to be raised when necessary to gain access to the interior of the hood.

The end walls of the hood alined with the guide —3— are preferably made of flexible water proof material divided along the longitudinal center of the guide to permit the ingress and egress of the can covers into and from the hood along the guide.

*Drying means.*

After the interiors of the cans and covers have been thoroughly sterilized by the hot water and steam, any excess steam or moisture of condensation which may remain therein, is removed by suction and for this purpose is provided suitable suction nozzles —39— and —40— arranged along the longitudinal centers of their respective guides —2— and —3—.

The nozzle —39— is connected to the under side of an opening —39'— in the bottom plate —5— of the guide —2— and is provided with a normally closed self-closing valve —41— having an operating member —42— projecting into the path of movement of a portion of the open end of the can as the latter is moved from the opening —22'— to the suction opening —39'— which latter is arranged in sequence with the openings —22— and —22'—, a distance apart from the opening —22— somewhat greater than the diameter of the open end of the can.

The outlet of the valve —41— is connected to a discharge conduit —43— which in turn may be connected to a waste pipe or to the atmosphere outside of the room in which the apparatus is located.

The inlet of the nozzle —39— is connected to an extension —19'— of the steam supply pipe —19— and discharges downwardly into the interior of the pipe —43— in a manner similar to that shown in Figure 6 for the suction nozzle —40—, the valve —41— being located in the extension —19'— to control the discharge of steam into the pipe —43— or rather into the nozzle —39— of which the valve forms a part in that it operates on the ejector principle.

As the open ends of the cans are moved along the guide plate —5— into registration with the opening —39'— and nozzle —39—, it engages the operating member —42— to open the valve —41— and thereby to permit the discharge of the steam downwardly into the pipe —43— for creating suction in the upper end of the nozzle —39—, opening —39'— and within the can registering with said opening, all of which has the effect of removing steam and moisture from the interior of the can for drying the same and at the same time preventing the entrance of foreign matter into the can by reason of its inverted position, and the downward withdrawal of the steam and moisture and any other matter which may have been loosened in the can by the sterilizing operation.

The suction nozzle —40— is arranged in sequence with the steam nozzles —25— along the longitudinal center of the guide —3— a distance from the last steam nozzle —25— somewhat greater than the diameter of the open end of the cover and is preferably elevated above the plane of travel of the lower end of the cover while being sterilized by hot water and steam.

The top of the suction nozzle —40— is provided with a horizontal plate —44— in a plane below the guide rails —7— and is provided with a central opening —45— registering with the opening in the nozzle but of less diameter than the interior diameter of the lower end of the cover.

The end of the plate —44— adjacent the last steaming nozzle —25— is provided with a downwardly inclined lead —44'— extending below the normal plane of travel of the lower ends of the covers so that as the latter are moved from the last steaming nozzle —25—, they will ride upon the incline —44'— and then upon the horizontal portion of the plate —44— to register their open ends with the openings —45— and with the open end of the nozzle —40—.

The steam pipe —20— is provided with an extension —20'— leading to the interior of the inlet side of the nozzle —40— and having a downturned end —46— discharging downwardly into a waste pipe —47— which may be connected to a soil pipe or to the exterior of the building to prevent the escape of steam into the room in which the apparatus is located.

The extension —20'— is provided with a valve —48— having an operating member —49— projecting into the path of movement of a portion of the cover, as —a— shown by dotted lines in Figure 6 whereby as the cover is registered with the suction nozzle —40— the operating member —49— will be engaged by said cover to open the valve for discharging steam downwardly into the suction nozzle and incidentally withdrawing steam and moisture from the interior of the cover together with any matter which may be loosened therein by the sterilizing operation.

Operation.

When sterilizing and drying the cans, the valve —36— in the flue —32— will be adjusted to close the passage —35— leading from the flue to the hood —34— thereby connecting the openings —22— and —22'— and interiors of the cans which may be registered therewith, with the atmosphere through the flue to remove excess steam and vapor which may be introduced into the cans.

The cans are first placed upon the grid —4— and moved by hand into registration with the hot water distributing nozzle —10— where it is cleansed and sterilized by hot water after which it is moved into registration with the opening —22— to cause the introduction of steam thereinto for further sterilizing purposes following which it is moved into registration with the opening —22'—for still further sterilizing after which it is again moved into registration with the suction nozzle —39— for removing steam and moisture from the cans and thereby effectively drying the same, while still in an inverted position, the sterilized cans being then moved along the guide to the discharge end thereof.

The covers are placed upon the left hand end of the guide —3— and are successively moved along said guide by the manipulation of the feeding bar —29— and its pawls —3—, first into registration with the hot water nozzles —12— and —13— for partially sterilizing and cleansing purposes, then into registration with the first steaming nozzle —25— for further sterilizing and next into registration with the second steaming nozzle —25— for additional sterilizing purposes and finally into registration with the suction nozzle —40— where the excess moisture and steam is removed to dry the cover following which the cover is removed from the right hand end of the guide and immediately applied to the open end of the can to which it belongs to reduce the liability of collection of foreign matter in the can after it, together with the cover has been thoroughly sterilized in the manner described.

Immediately preceding the sterilizing operation upon the covers, the valve —36— is adjusted to open the passage —35— and to close the flue —32— below said passage thereby directing the full force of the draft to the interior of the hood —34— for removing the steam and vapor and preventing its escape into the room in which the apparatus is located.

We claim:

1. In an apparatus for sterilizing milk cans, a horizontal guide plate having an opening therethrough and along which the open can is fed with its open end at the bottom to register with said opening, a nozzle registering with the opening for discharging steam therethrough into the registering can, and a draft flue having one end extended under the plate and surrounding the nozzle and opening for withdrawing steam from the open lower end of the registering can by suction.

2. In an apparatus for sterilizing milk cans and covers therefor, a can-guide and a cover-guide each having a steaming nozzle in the bottom thereof, a draft flue having one end surrounding the steaming nozzle of the can-guide and its other end extended upwardly at one side of both guides, a hood enclosing the nozzle of the cover guide and connected by a passage with said flue, and a damper controlling said passage.

In witness whereof we have hereunto set our hands this 12th day of January, 1924.

LOUIS G. FORD.
WILLIAM H. VAN DINE.